Nov. 10, 1942.       E. BASSIST       2,301,770
IMPROVED NEGATIVE
Filed Dec. 28, 1940
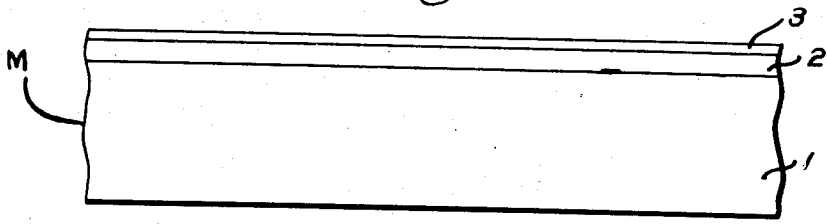
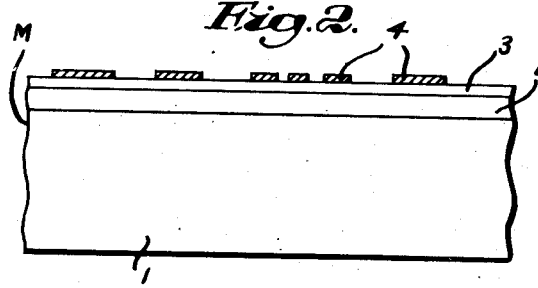 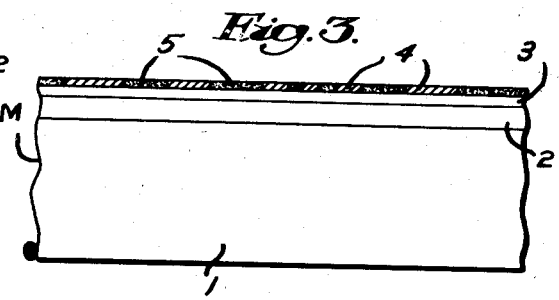
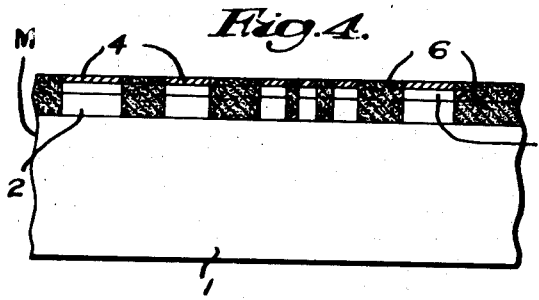 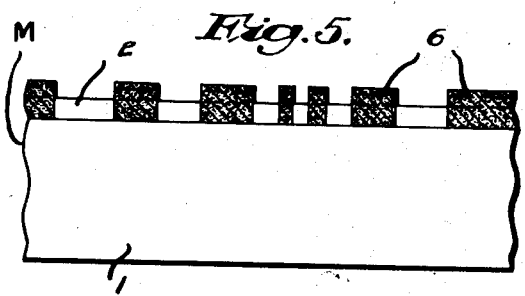
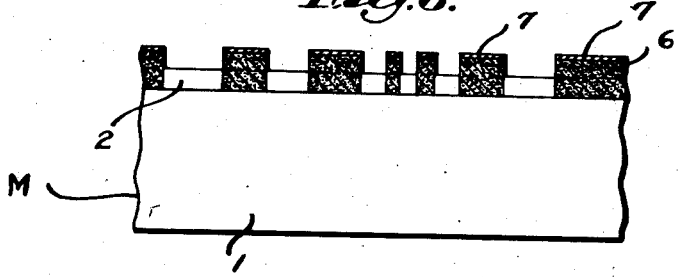
Inventor:
Ellis Bassist
Attorney Patented Nov. 10, 1942

2,301,770

UNITED STATES PATENT OFFICE 2,301,770

IMPROVED NEGATIVE

Ellis Bassist, Brookline, Mass., assignor to William Craig Toland, trustee

Application December 28, 1940, Serial No. 372,142

6 Claims. (Cl. 41—46)

This invention relates to negatives and more especially to negatives employed in making printing plates and to their methods of preparation.

In making printing plates to reproduce a given subject matter, it is customary to form negatives of the subject matter by photographic procedures and then dispose the negatives in contact with light-sensitive coating materials applied on printing plate supports. Thereafter photographic light is allowed to pass through the translucent portions of the negative to harden the underlying light-sensitive coating portions and render them grease-receptive. The coating thus exposed is covered with greasy ink and developed in the usual manner to form a positive printing plate. During photographic preparation of negatives, difficulty arises, due to the fact that the characters or parts of the subject matter may be of different sizes and require different periods of exposure and different intensities of light for proper development. Also the method of photographically copying the subject matter requires time and care, and is limited to the preparation of one negative at a time.

The principal object of the invention is to improve negatives, and to provide a negative member which is prepared by mechanical operations, as distinguished from a photographic method of copying, with a view to eliminating inaccuracies due to photographic copying procedures, and also to shortening the time necessary for making a number of photographic negatives. A further object of the invention is to present a novel method of making and correcting photographic negatives, and to provide a means for facilitating the making of printing plates. The invention also aims to provide a method of making negatives which is fast, accurate and easily carried out.

The nature of the invention, and its objects, will be more fully understood from the following description of the drawing and discussion relating thereto.

In the accompanying drawing:

Figure 1 is a fragmentary view in elevation illustrating a negative material of the invention;

Fig. 2 is a fragmentary view in elevation illustrating a step in the method of forming a negative from a material such as that illustrated in Fig. 1;

Fig. 3 is a fragmentary elevational view illustrating another step in the method referred to;

Fig. 4 is a fragmentary elevational view of still another step in making the negative in accordance with the invention;

Fig. 5 is a view similar to Fig. 4 illustrating a final step in the method of making the negative member; and Fig. 6 is a fragmentary elevational view illustrating a modification of method of making negatives.

In accordance with the invention, I provide a novel negative material which is adapted to be made into a negative without resorting to the conventional procedure of photographically copying the subject matter. This negative material includes a base 1 having a coating 2 of a hydrophilic material and a second layer of water-soluble material associated with and overlying the hydrophilic material.

The base 1 is translucent and preferably is composed of a flexible material which will resist stretching or shrinking. One example of a suitable substance is a translucent paper impregnated with waterproofing materials such as water-repellent resins. Other suitable substances are glass, translucent films and the like.

In the preferred impregnated paper form of base, the hydrophilic material 2 may be partly impregnated therein and may overlie the base in the form of a coating. By the term "hydrophilic material," I mean a substance which will absorb water, and in some instances become swollen thereby, and yet will not dissolve away in water. One example of a hydrophilic material, of the type referred to, is a coating of a vinyl compound as for instance polyvinyl alcohol and the like. The coating or hydrophilic colloidal body 2 may in some cases include a hardening agent as a chromic salt.

The water-soluble material 3 is partly impregnated in and overlies the coating 2 at one side of the base and consists of a film of gum arabic of some suitable strength, such as a film obtained from an aqueous suspension of gum arabic of a ten percent solution strength. The film of gum arabic, by reason of its being partly impregnated in the coating 2 presents a novel combination of a water-soluble body, which is itself absorbent, absorbed in a water-soluble or hydrophilic material. In addition, the gum arabic film affords a writing surface which readily accepts and holds either greasy ink or aqueous mixtures, which is absorbent with respect to such materials, and which may be readily dissolved away in water.

Upon the material M, subject matter, as for example typeset subject matter, is printed with a greasy ink to form an image 4, as shown in Fig. 2. The greasy ink image 4 thus obtained is allowed to dry and thereafter a water suspension of a light-sensitive colloid, such as bichromated albumin, and an opaque material, such as a dye, is applied over the entire surface of the plate. Since the light-sensitive coating has a water base, it is rejected in all parts of the plate surface covered by the greasy ink image 4. As a result, a coating 5 is applied to the surface of the gum arabric around the printing characters as shown in Fig. 3.

The coating 5 of light-sensitive colloid is partly absorbed into the hydrophilic material 2 and the overlying film of gum arabic 3, and when dry exposed to photographic light. This hardens the light-sensitive colloid and dye coating in the hydrophilic material and the gum arabic, and renders such portions completely opaque. The plate may then be washed under running water and lightly rubber over with a pad of soft material. By this procedure water is allowed to penetrate into those portions of the gum coating directly under the greasy image 4. Such portions of the gum are dissolved away down to the layer of hydrophilic material 2 and thus throw off the greasy image 4. The remaining layer of hydrophilic material 2 is translucent, together with the base upon which it is mounted, and there is obtained a true negative of the typeset subject matter made up of the parts 6 which include the photographically exposed albumin, gum, hydrophilic material and dye.

An important feature of the invention is the combination of the gum arabic film with a hydrophilic coating on a translucent support.

The layer of gum arabic 3 provides a surface which will readily accept and accurately hold lines, or other forms of subject matter, of both greasy ink and aqueous suspensions or mixtures. This allows a greasy image to be applied, and thereafter a coating of bichromated albumin to be brought into abutting relation to the greasy image without either of the materials tending to crawl or lose their sharpness of outline. The combination of a material such as the dye with a light-sensitive colloid coating employing a chromic salt as the light-sensitizing agent allows the formation of hardened grease-receptive portions which are opaque. This broadens the function of light-sensitive salts of this nature and makes possible an efficient method of making negatives.

The film of gum arabic dissolves in water and washes away in the same manner as the unexposed parts of a colloid coating are washed away during conventional development of a lithographic printing plate. This allows removal of the greasy image first applied. In addition the film of gum arabic is characterized by a certain degree of softness which provides for the film being easily washed away, and the ink image referred to rubbed off, without formation of ragged edges at those points where the gum is hardened in the printing portions of the plate. This is highly important in insuring sharpness of outline.

The gum arabic also tends to become impregnated in the hydrophilic coating 2, and is further important in serving as an absorptive body through which ammonium bichromate and albumin may readily pass to strike into the hydrophilic coating. This provides for the hydrophilic coating, the gum, and the bichromated albumin becoming bonded together to form a clearcut negative member.

Another important feature consists in the ability of the hydrophilic material, as embodied by polyvinyl alcohol, to prevent blurring when the bichromated albumin strikes through the gum arabic layer 3. The polyvinyl alcohol is of such character that when the bichromated albumin is coated over the surface of the plate around the greasy ink image already applied thereto, this material does not diffuse or spread out but is held in the polyvinyl alcohol layer with sharp outlines corresponding to the outline of the first applied greasy image. This allows a true size of line or other subject matter, to be maintained all the way down to the alcohol layer so that when the gum layers in the parts underlying the greasy ink image are washed away, a surface of the alcohol layer 2 is exposed which conforms exactly to the outline of the greasy ink image originally disposed on the gum arabic layer. The hydrophilic material also serves as an excellent bonding medium for holding the gum arabic film on the base 1.

The negative thus prepared is of improved character. Small and large characters for a given typeset subject matter are reproduced with equal strength and clearness, and no photographic loss or error occurs since the entire proceeding is a contact operation.

The procedure of processing the plate material M after the subject matter has been printed thereon, is a relatively simple one, requiring only a short period of time and resembling closely the commercial development of a lithographic printing plate. The significance of making plates with the printing material, and its method of processing described, may be more readily understood when its use is illustrated in connection with printing a large number of copies of the subject matter under discussion. Assuming that 100,000 impressions are required, on separate sheets having a size of 5½" x 8½", the most efficient procedure is to provide a large number of negatives which may be mounted on a master plate so that a relatively small number of sheets may be ordered and printed and thereafter cut to produce the required number of sheets of the size noted. For instance, if sixteen photographic negatives can be quickly prepared, they may be mounted on a master plate of a size such as 22" x 34", which is an available press plate size. With such a plate, 6,250 separate sheets are printed. Each sheet may thereafter be cut to form sixteen sheets of the required size of 5½" x 8½". This operation of printing the 6,250 sheets is much more efficient than the process of printing 100,000 sheets of the desired size.

The sixteen negatives required in the example just described may be readily prepared by the method of the invention since sixteen impressions of the subject matter may be printed almost as quickly as one and the whole sixteen impressions may be processed on one sheet in the same amount of time required for processing one impression. However, in preparing sixteen negatives of the subject matter noted by photographic copy methods, a great deal more time would be required since each copy must be separately prepared in the camera and much more expensive material and labor would be utilized.

The negative of the invention also makes possible certain desirable corrective operations.

These operations relate to changes of the type effected in carrying out the "submarine process" for making printing plates. The principal feature of the submarine process is the preparation of plates with printing portions consisting of bichromated albumin which is softened by the addition of gum arabic. These softened printing portions, while immersed in water, may be lightly rubbed over and minutely decreased in size to beneficially modify the ink-receptive ability of the printing image. This allows for very desirable corrections to be effected in connection with the preparation of color plates for blended color subject matter. The procedure is objectionable due to the fact that it is necessary to hand transfer the corrected images to counter-etched lithographic printing members. The hand transfer operation is expensive and time-consuming, and has resulted in the discontinuance of the submarine process in most lithographic work.

The negative of the invention may be coated over its entire surface with the light-sensitive coating material. The coating is exposed with conventional color separation negatives to form opaque portions. The soft gum arabic 3 allows the opaque portions to be corrected, in accordance with the method of the submarine process, by washing while immersed in water. The negative thus formed may be immediately dried and employed in a vacuum frame or any photographic composing machine. As a result, the excellent quality and accuracy of blended color reproduction obtainable from the corrective procedures of the submarine process may therefore be effectively utilized by means of the negative member of the invention.

Various changes in the handling and application of the invention may be resorted to. For example, instead of utilizing an opaque material, as dye, in the light-sensitive coating, I may employ other opaque substances as carbon black and the like. I may also dispense with the dye material. In this case the photographically hardened parts of bichromated albumin are covered with an opaque greasy ink 7 before the ink image 4 and the underlying gum portions are washed away. A developed plate of this character is illustrated in Fig. 6 of the drawing.

Still other changes may be resorted to, as for instance I may apply the light-sensitive coating and opaque material by apparatus such as an air brush, or by stippling, or in other ways. Similarly, various modifications may be resorted to in connection with the material used for the base, and the hydrophilic translucent coating on the base, in combination with the film of water-soluble gum arabic. Other light-sensitive coatings such as mixtures of chromic salts and casein, glue, polyvinyl alcohol, and other similar substances, may be utilized.

It will be seen that I have provided an improved photographic negative in which accuracy and uniformity of greatly enhanced character are attained. A method of making negatives quickly and cheaply is made available, particularly adapted to producing a relatively large number of negatives for handling printing orders of considerable volume. Various improvements and savings in connection with making printing plates are also made available by the use of the negative and its treatment during processing.

While I have shown a preferred embodiment of the invention, it should be understood that various changes and modifications may be resorted to in keeping with the spirit of the invention.

Having described my invention, I claim:

1. As an article of manufacture a negative comprising a base having translucent portions and opaque portions, said opaque portions of the base including a vinyl resin, gum arabic, a water-insoluble colloid, an opaque material, and a chromic salt which has been exposed to photographic light.

2. As an article of manufacture a negative comprising a sheet of material having translucent portions and opaque portions, said opaque portions including polyvinyl alcohol, gum arabic, ammonium bichromate, albumin and an opaque material.

3. As an article of manufacture a negative comprising a translucent sheet of paper having opaque portions, said opaque portions including a vinyl resin, gum arabic, albumin, ammonium bichromate which has been exposed to photographic light, and an opaque material.

4. As an article of manufacture a negative comprising a sheet of material having translucent portions and opaque portions, said translucent portions including a vinyl compound, gum arabic, albumin, and ammonium bichromate hardened together to form a grease-receptive mass.

5. As an article of manufacture a negative comprising a translucent sheet of material having opaque portions, said opaque portions including a vinyl compound, gum arabic, albumin and ammonium bichromate which has been exposed to photographic light, thereby to form a grease-receptive mass, and a layer of greasy opaque material overlying said grease-receptive mass.

6. As an article of manufacture a photographic negative comprising a base having translucent portions and opaque portions, the opaque portions of the base including a hydrophilic colloid, a substratum of a second colloid which has been hardened to a water-insoluble state, a layer of a third colloid overlying the substratum of second colloid, the said third colloid occurring in a hardened grease-receptive state, and a coating of greasy opaque material superimposed upon the layer of the said grease-receptive colloid.

ELLIS BASSIST.